(12) United States Patent
Komoda et al.

(10) Patent No.: US 6,427,768 B2
(45) Date of Patent: Aug. 6, 2002

(54) HEAT EXCHANGER AND BRAZING METHOD

(75) Inventors: Shuji Komoda, Kariya; Takayoshi Harada, Handa; Shinichi Hamada, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/793,313

(22) Filed: Feb. 26, 2001

Related U.S. Application Data (63) Continuation of application No. PCT/JP00/04378, filed on Jun. 30, 2000.

(30) Foreign Application Priority Data

Jun. 30, 1993 (JP) .............................. 11-186626

(51) Int. Cl.[7] .................................. F28D 1/03
(52) U.S. Cl. .................. 165/145; 165/916; 165/157
(58) Field of Search ................. 165/76, 157, 158, 165/162, 41, 167, 916, 145

(56) References Cited

U.S. PATENT DOCUMENTS

| | | | | |
|---|---|---|---|---|
| 4,561,494 A | * | 12/1985 | Frost | 165/109.1 |
| 5,014,775 A | * | 5/1991 | Watanabe | 165/167 |
| 5,472,045 A | * | 12/1995 | Poehlman | 123/196 A |

FOREIGN PATENT DOCUMENTS

| | | | |
|---|---|---|---|
| JP | A-59-191888 | 10/1984 | |
| JP | A-59-208398 | 11/1984 | |
| JP | A-63-268564 | 11/1988 | |
| JP | A-1-273666 | 11/1989 | |
| JP | A-3-213996 | 9/1991 | |
| JP | A-3-221786 | 9/1991 | |
| JP | 4-283399 A1 | * 10/1992 | 165/916 |
| JP | A-4-353392 | 12/1992 | |
| JP | A-10-131736 | 5/1998 | |

* cited by examiner

*Primary Examiner*—Allen Flanigan
(74) *Attorney, Agent, or Firm*—Harness, Dickey & Pierce, PLC (57) ABSTRACT

An assembly (oil cooler unit), under the state where first and second plates (130, 140) prevent a heat exchange core (110) from falling from a casing (120), is provisionally assembled, and this oil cooler unit is dipped in a flux to apply the flux. A seal surface plate (150) is then assembled to the second plate (140) and is brazed by heat-brazing in an inert gas atmosphere. Since a flux residue on the seal surface plate (150) can be drastically reduced in this manner after brazing is complete, the seal surface plate (150) can secure predetermined surface texture even after brazing is complete while the number of process steps necessary for applying the flux is reduced.

6 Claims, 9 Drawing Sheets

HEAT EXCHANGER AND BRAZING METHOD

CROSS-REFERENCE TO RELATED APPLICATIONS

This application is based upon and claims priority of Japanese Patent Application No. 11-186626, filed Jun. 30, 1999, the contents being incorporated therein by reference, and is a continuation of PCT/JP00/04378.

TECHNICAL FIELD

This invention relates to a heat exchanger and a brazing method. The present invention is effective when applied to an oil cooler for cooling engine oil of cars and operating oil for automatic transmissions (ATF) (hereinafter merely called "oil"), and to the brazing of the members.

BACKGROUND ART

Oil coolers of cars generally have a construction in which a heat exchange core (hereinafter called merely the "core") produced by stacking a plurality of plates in a direction of their thickness is assembled into a substantial cylindrical casing, and a seal surface plate is brazed to an open portion of the casing while closing the open portion lest the core falls from inside the casing.

Here, the seal surface plate plays a sealing function of sealing a gap between an engine and an oil cooler and preventing the engine oil from leaking, and also a function of a fitting bracket for fitting the oil cooler to the engine (cylinder block). Therefore, a contact surface (particularly, an O-ring groove) of the seal surface plate with the engine (cylinder block) is so finished, by machining it, to possess surface texture of not greater than 12.5 z.

The inventors of the present invention have attempted to reduce the weight of the oil cooler by using aluminum as a material of the plate (core), the casing and the seal surface plate, and have encountered the following problems.

When brazing is conducted under heating inside a furnace, oxygen in the atmosphere forms an oxide film on the surface of aluminum, thereby impeding brazing. To braze not only the oil cooler but also those articles which are made of aluminum, a method has been generally employed that applies a flux for removing the oxide film on the aluminum material (the plate, the casing and the seal surface plate in this example) clad with the brazing material, and conducts heat-brazing in an inert gas atmosphere such as nitrogen.

As described above, however, the oil cooler includes a large number of components that are fitted by brazing. If the flux is applied to each of these components, the number of production steps of the oil cooler drastically increases, thereby increasing the cost of production.

The flux so applied remains on the surface of each component even after brazing is complete, and this remaining flux (hereinafter called the "flux residue") increases the surface texture. In consequence, the components for which predetermined surface texture is required, such as the seal surface plate, cannot secure predetermined surface texture after brazing is complete.

DISCLOSURE OF THE INVENTION

In view of the problems described above, the present invention aims at securing a predetermined surface texture on a seal surface plate even after completion of brazing while reducing the number of process steps necessary for applying a flux.

To accomplish this object, the present invention provides a heat exchanger comprising a casing having an opening for inserting a heat exchange core, for storing the heat exchange core, fall preventing members to prevent the heat exchange core falling from the casing, brazed to the casing after being fixed to the casing, and a seal surface plate finished to predetermined surface texture and brazed to at least one of the sides of the fall preventing members and the casing after the heat exchange core and the fall preventing members are fixed to the casing.

According to this construction, an assembly comprising the heat exchange core and the casing can be dipped into a flux before the seal surface plate is assembled. Consequently, a flux residue on the seal surface plate can be drastically reduced after brazing is complete.

As the assembly is dipped into the flux, the number of process steps necessary for applying the flux can be reduced, and predetermined surface texture can be secured on the seal surface plate even after brazing is complete.

A brazing method of a heat exchanger according to the present invention comprises a temporary assembly step of storing a heat exchange core in a casing, and fixing fall preventing members, to prevent the heat exchange core falling from the casing, to the casing, a dipping step of dipping an assembly of the heat exchange core, the casing and the fall preventing members into a flux after the temporary assembly step is complete, and a brazing step of integrally brazing the heat exchange core, the casing, the fall preventing members and a seal surface plate finished to predetermined texture under the state where the seal surface plate is brought into contact with at least one of the sides of the fall preventing members and the casing, after the dipping step is complete.

In consequence, the flux residue on the seal surface plate can be drastically reduced after brazing is complete, and predetermined surface texture can be secured on the seal surface plate even after completion of brazing while the number of process steps necessary for applying the flux is reduced.

The above and other features of the present invention will be more fully understood from the following description of preferred embodiments taken in connection with the accompanying drawings.

BEST MODE FOR CARRYING OUT THE INVENTION (First Embodiment)

Figure 1:
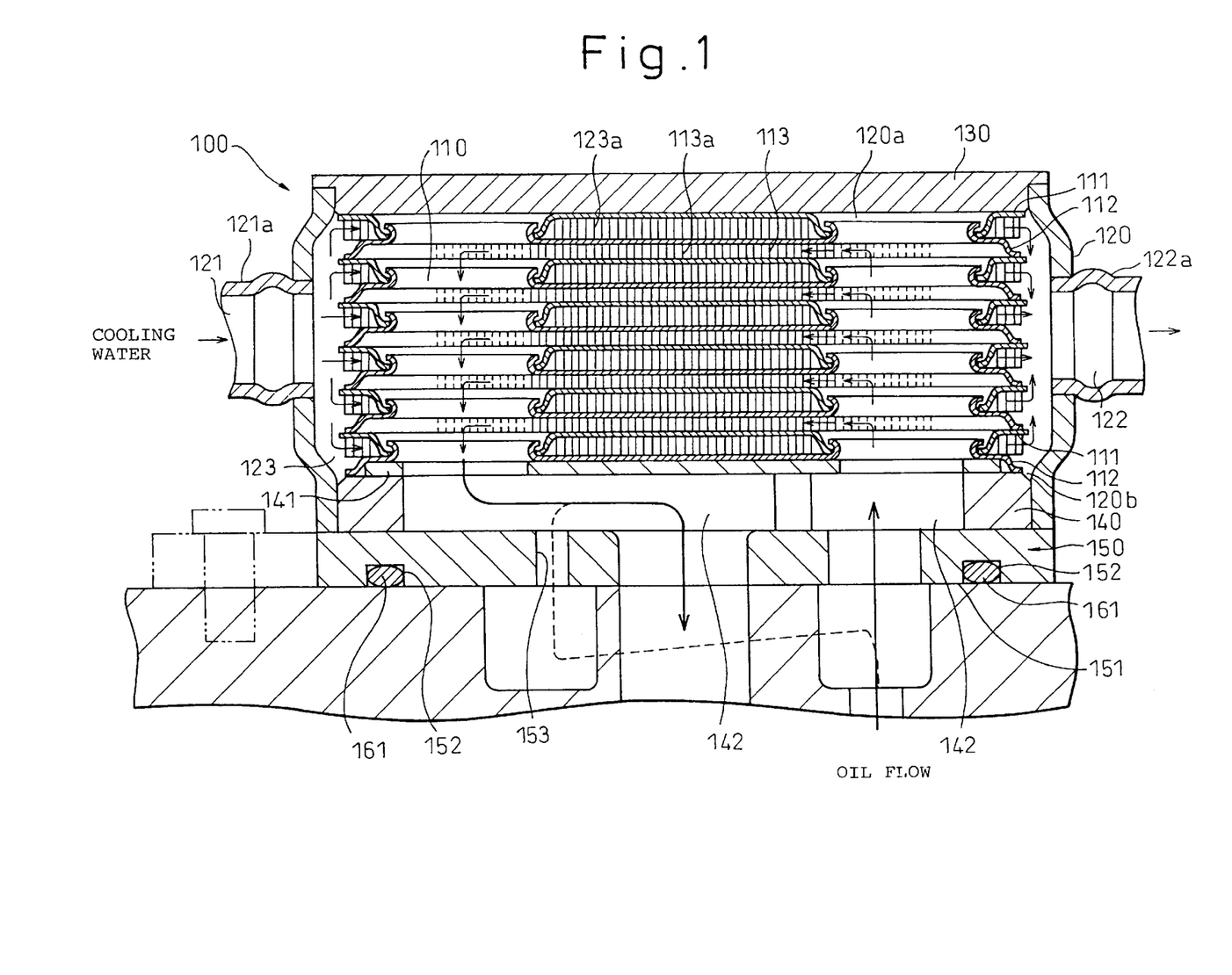
FIG. 1 is a sectional view of oil cooler according to the first embodiment of the present invention.

This embodiment represents the application of a heat exchanger and a brazing method according to the present invention to an oil cooler for a car. FIG. 1 is a sectional view of the oil cooler 100 in this embodiment.

Incidentally, the oil cooler 100 is fitted to the wall surface of a cylinder block or a crank case of an engine (not shown) or to the wall surface of a transmission main body, executes heat exchange between engine cooling water (hereinafter called "cooling water") and engine oil or the operating oil (ATF) for an automatic transmission, and cools the oil.

Reference numeral 110 denotes a heat exchange core (hereinafter called merely the "core") that executes heat exchange between the cooling water and the oil. The core 110 is produced by stacking a plurality of plates 111 and 112 press-molded the plates in such a manner as to have predetermined concavo-convexities, in the direction of their thickness.

Reference numeral 120 denotes a substantially cylindrical casing for storing the core 110. Disc-like first and second plates (fall preventing members) 130 and 140 close openings 120a and 120b of the casing 120 at both ends in the axial direction. There is thus formed inside the casing 120 a confined space for storing the core 110.

A cylindrical wall portion of the casing 120 has an inflow port 121 through which cooling water flows in and an outflow port 122 through which cooling water after heat exchange with the core 110 (oil) flows out.

In this instance, the space 113 formed (partitioned) by the plates 111 and 112 defines an oil flow passage (fluid passage). Of the space defined by the casing 120 and the first and second plates 130 and 140, a space 123 (space inside the casing 120) outside a space 113 (hereinafter called the "oil passage 113") constitutes a passage (hereinafter called the "cooling water passage 123") through which cooling water flows. Incidentally, inner fins 113a and 123a are provided in both passages 113 and 123 to promote heat exchange between the oil and cooling water.

Reference numeral 150 denotes the seal surface plate that is brazed to the second plate 140. An O-ring groove 152 is formed on the surface 151 (the surface on the contact side of the wall surface of the cylinder block or crank case) of the seal surface plate 150 on the side opposite to the second plate 140. This surface 151 is hereinafter called the "seal surface 151". An O-ring 161 made of an acrylic resin is fitted into the O-ring groove 152 to seal a gap between the seal surface 151 and the wall surface of the cylinder block or the crank case.

Both O-ring groove 152 and the seal surface 151 are machined to predetermined surface texture (not greater than 12.5 z in this embodiment) to secure a predetermined seal performance.

Reference numeral 153 denotes a bypass hole that communicates the oil inflow side of the oil cooler 100 with the oil outflow side while bypassing the core 110. This bypass hole 153 has a predetermined diameter (a pressure loss) lest the oil excessively flows to the oil outflow side while bypassing the core 110. Reference numeral 141 denotes a third plate made of aluminum. The third plate 141 comes into contact with the plate 112 of the lowermost stage and reinforces the strength of this plate 112.

Next, the brazing method of the oil cooler 100 according to this embodiment will be explained step-wise.

First, the plates 111 and 112, the first and second plate 130 and 140 and the casing 120 each made of an aluminum material clad with a brazing material on a predetermined surface are shaped.

Figure 2:
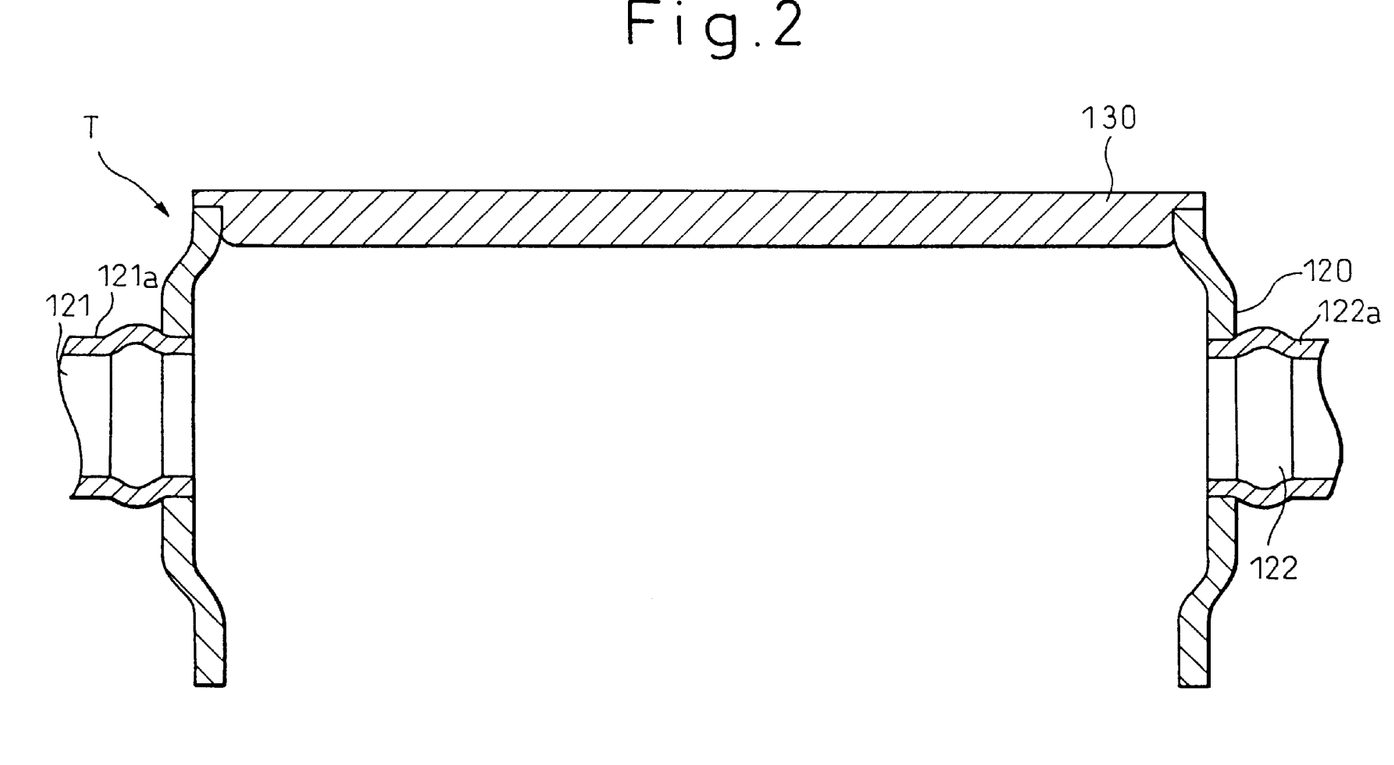
FIG. 2 is a sectional view of a tank during a tank formation process according to the first embodiment of the present invention.

Next, the first plate 130 is pushed into one of the end sides (on the side of the opening 120a) of the casing 120 and is provisionally fixed to the casing 120. In this way, a cup-like article (hereinafter called the "tank T"), in which the first plate 130 closes one of the ends of the casing 120, is shaped as shown in FIG. 2 (tank formation step).

Incidentally, connection pipes 121a and 122a that constitute the inflow port 121 and the outflow port 122 are provisionally fixed to the cylindrical wall of the casing 120 by forcing fit or clinching.

Figure 3:
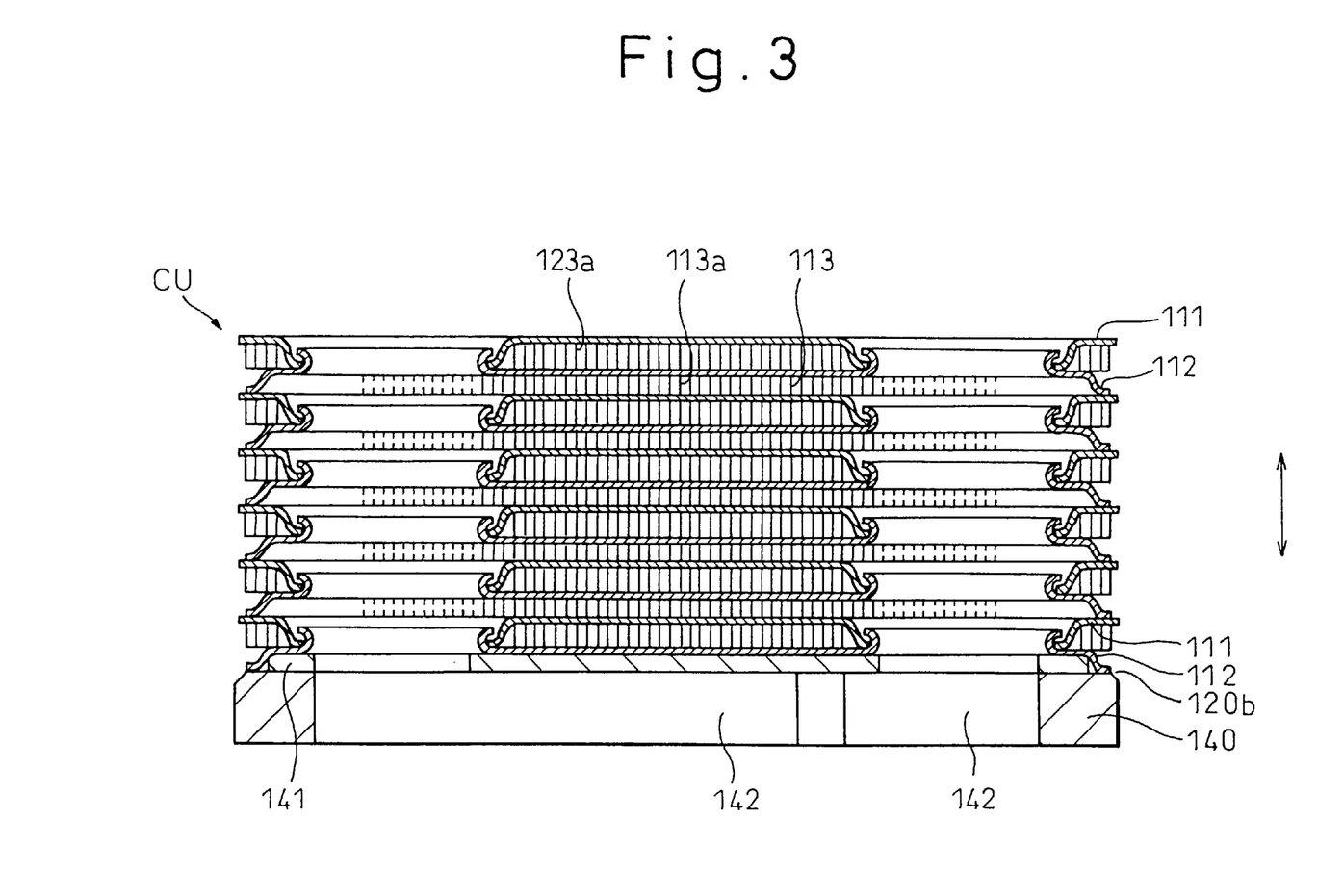
FIG. 3 is a sectional view of a core unit in a core assembly process according to the first embodiment of the present invention.

Next, while the third plate 141 is stacked on the second plate 140 as shown in FIG. 3, the plates 111 and 112 and the inner fins 113a and 123a are serially stacked in the direction of thickness of the plates 111 and 112, forming the core 110 (core assembly step). The assembly obtained by this core assembly step is called hereinafter the "core unit" CU.

Figure 4:
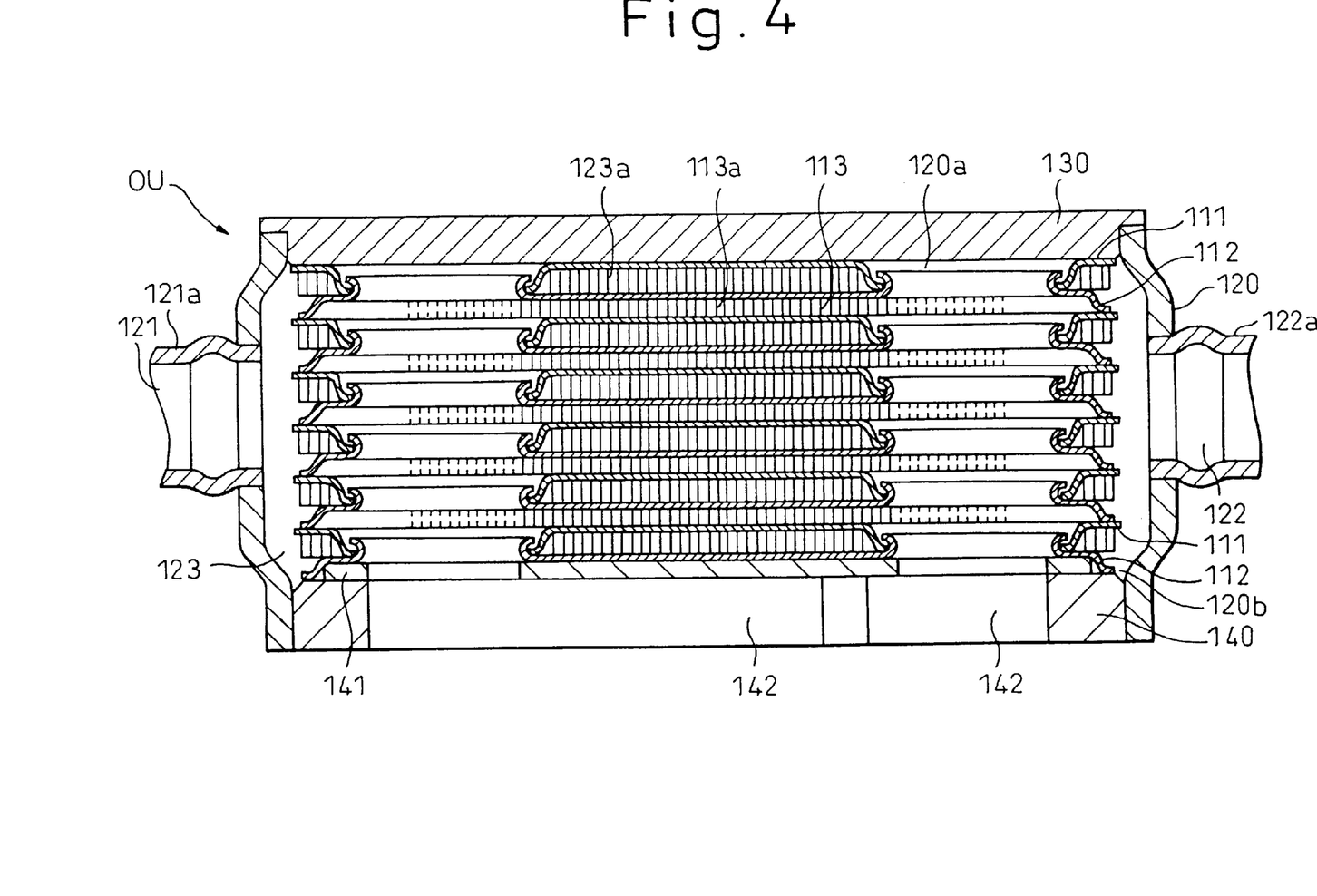
FIG. 4 is a sectional view of an oil cooler unit in a provisional assembly process according to the first embodiment of the present invention.

The tank T is put above the core unit CU as shown in FIG. 4, and the core 110 is stored in the casing (tank) 120. The second plate 140 is forced fit to the other end side (on the side of the opening 120b) of the casing 120, and is provisionally fixed to the casing 120 (temporary assembly step).

The assembly obtained by this temporary assembly step (hereinafter called the "oil cooler unit OU") is dipped in a flux solution having a predetermined concentration (dipping step). Incidentally, the flux enters the tank T through an oil passage hole 142 formed in the second plate 140, the inflow port 121 and the outflow port 122 (see FIGS. 1, 2 and 4), and adheres to the core unit CU, the casing 120, and so forth.

Next, the oil cooler unit OU is pulled out from the flux. While the seal surface plate 150 is disposed on the second plate 140 with the second plate side 140 being the upper side (in the opposite state to FIG. 1), the oil cooler unit OU and the seal surface plate 150 are brazed by heat-brazing in an inert gas atmosphere (brazing step).

Incidentally, the clad brazing material is fused during the brazing process and the height of the core 110 (the size in the stacking direction) decreases. Therefore, the size of the casing 120 in the axial direction must be selected while this loss is taken into account.

The feature of this embodiment is as follows.

The core 110 is dipped into the flux while it is prevented from falling from the casing 120 (under the state where the oil cooler unit OU is assembled) by the first and second plates 130 and 140 that are separately formed from the seal surface plate 150. Therefore, the flux can be applied to the core unit CU and the tank T by a single process (in one process step) without assembling the seal surface plate 150.

In consequence, the seal surface plate 150 and the oil cooler unit OU can be brazed integrally under the state where the flux is not applied to the seal surface 151 of the seal surface plate 150 and to the O-ring groove 152. As a result, the flux residue on the seal surface 151 and the O-ring groove 152 after completion of brazing is extremely small.

As described above, the oil cooler and its brazing method according to this embodiment can secure predetermined surface texture on the seal surface plate 150 even after completion of brazing while the number of process steps necessary for applying the flux is decreased.

Incidentally, because the oil cooler 100 constitutes a part of the oil passage of the engine, great influences might be exerted on the engine side if flow inside the oil cooler 100 is impeded due to clogging of the oil passage 113, or the like.

In contrast, this embodiment includes the bypass hole 153 formed in the second plate 140. Therefore, even when the oil passage 113 is clogged, the oil is allowed to flow, and adverse influences on the engine side can be prevented in advance.

(Second Embodiment)

Figure 5:
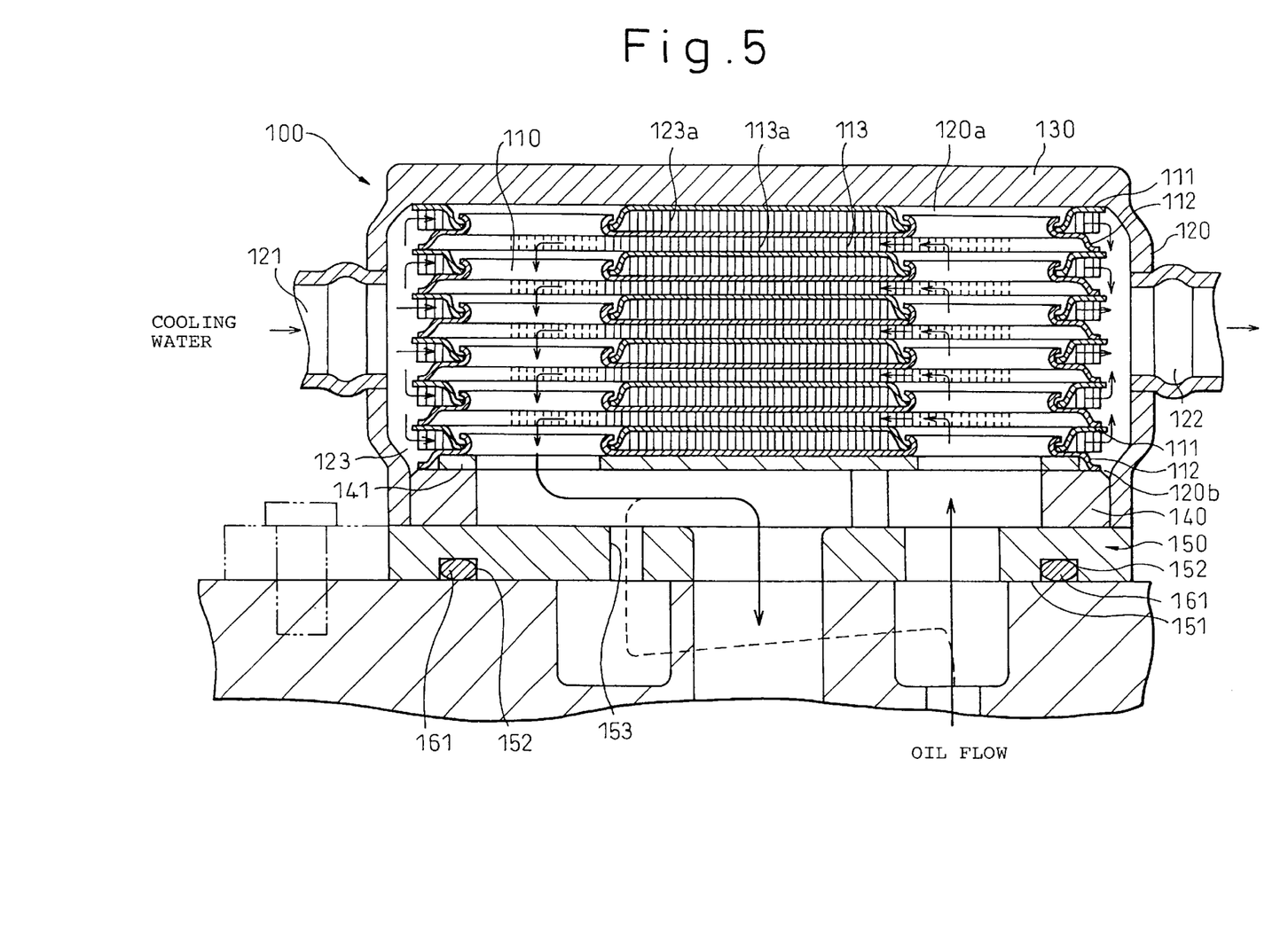
FIG. 5 is a sectional view of oil cooler according to the second embodiment of the present invention.

In the first embodiment, one of the ends of the casing 120 in the axial direction is closed by the first plate 140 to thereby form the cup-like tank T. However, the tank T may be integrally formed by deep drawing (press machining) as shown in FIG. 5.

(Third Embodiment)

Figure 6:
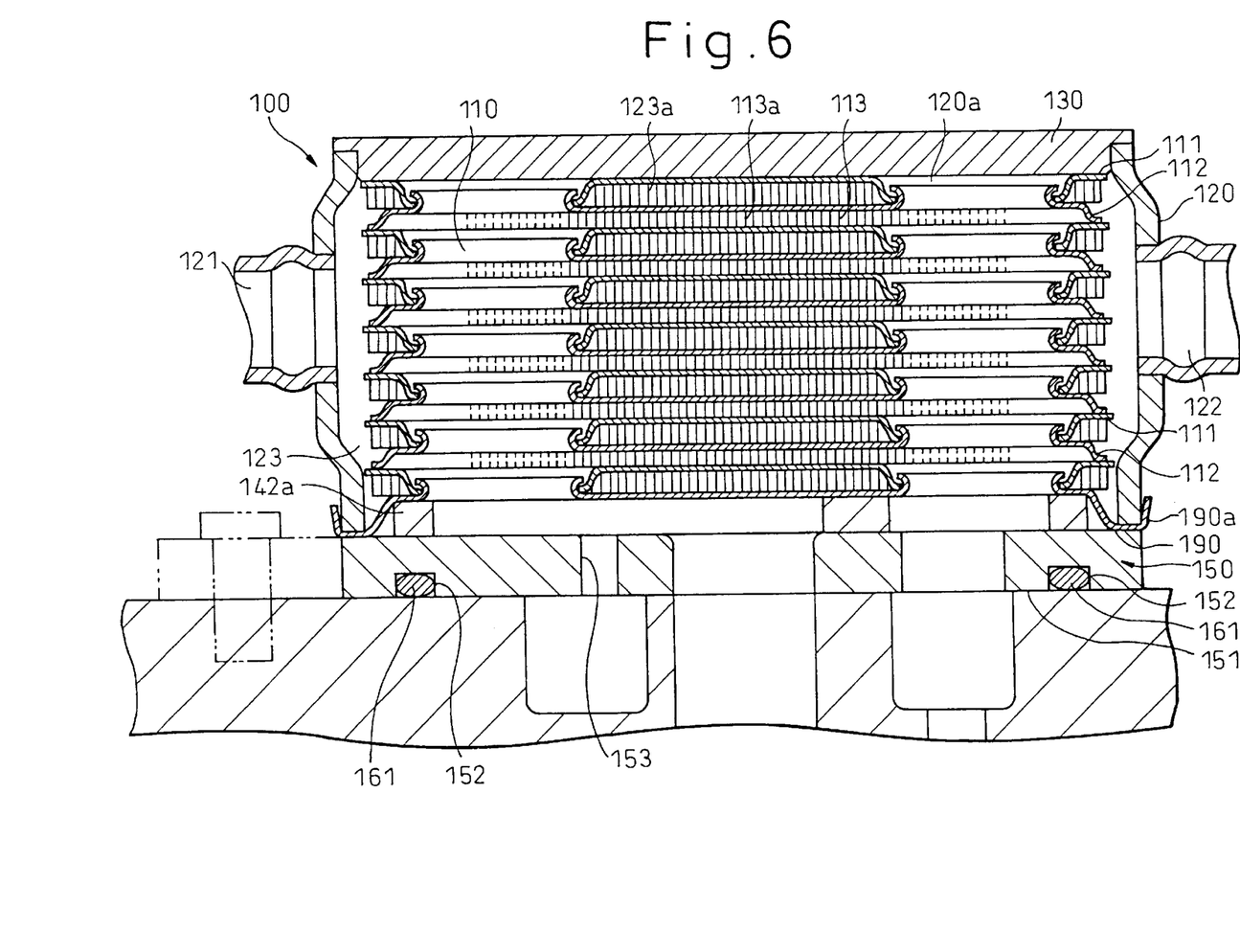
FIG. 6 is a sectional view of oil cooler according to the third embodiment of the present invention.

In the first and second embodiments, the second plate 140 is forced fit to the casing 120 (tank T) so that the core unit CU can be prevented from falling from the casing 120 (tank T). In this embodiment, a plate 190 is disposed in place of the second plate 140 as shown in FIG. 6, and a part of the outer peripheral side of this plate 190 is extended to the outer wall of the casing 120 to form an extension portion 190a. The extension portion 190a is caused to undergo plastic deformation in such a manner as to be pushed to the outer wall of the casing 120, and the plate 190 is fixed by clinching to the casing 120. Furthermore, a plate 142a (fall preventing member) is forced fit to a recess of the plate 190 to constitute the oil cooler unit OU. In this embodiment, the plate 190 plays also the function of the plate 112.

While the plate 190 and the plate 142a function as the fall preventing members for preventing the core unit CU from falling from the casing 120 (tank T), the oil cooler unit OU can be dipped into the flux, and the process steps necessary for applying the flux can be decreased. On the other hand, the seal surface plate 150 can secure predetermined surface texture even after completion of brazing.

(Fourth Embodiment)

Figure 7:
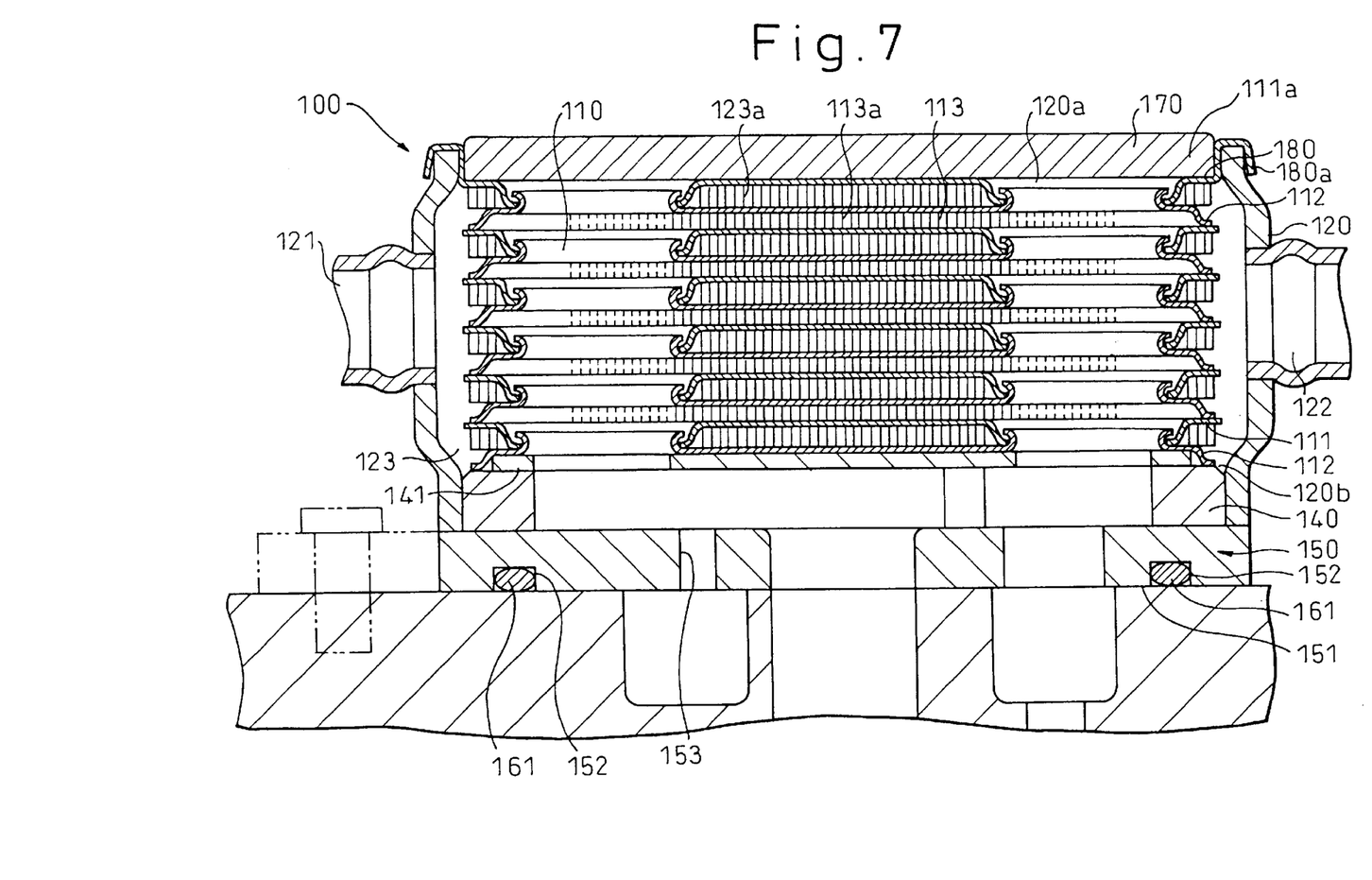
FIG. 7 is a sectional view of oil cooler according to the fourth embodiment of the present invention.

In the third embodiment described above, the plate 190 is fixed by clinching to the casing 120. In this embodiment, a plate 180 has an extension portion 180a extending to the outer wall of the casing 120 as shown in FIG. 7, and is fixed by clinching to the casing 120.

Incidentally, the plate 170 is forced fit to a recess 111a (a portion of the plate 111 formed inside the casing 120) of the plate 111 on the side of the first plate 130, and is then brazed.

In consequence, while the plate 111 on the side of the first plate 130 is allowed to function as a fall preventing member for preventing the core unit CU from falling from the casing 120 (tank T), the oil cooler unit OU can be dipped into the flux, and the number of the process steps necessary for applying the flux can be reduced. On the other hand, the seal surface plate 150 can secure predetermined surface texture even after completion of brazing.

Incidentally, the plate 180 is fixed by clinching so as to prevent fall-off of the core unit CU in this embodiment. Therefore, it is possible to dip the plate 170 into the flux solution in the same way as the plate 150 and then to assemble it without forcing fit.

(Fifth Embodiment)

Figure 8:
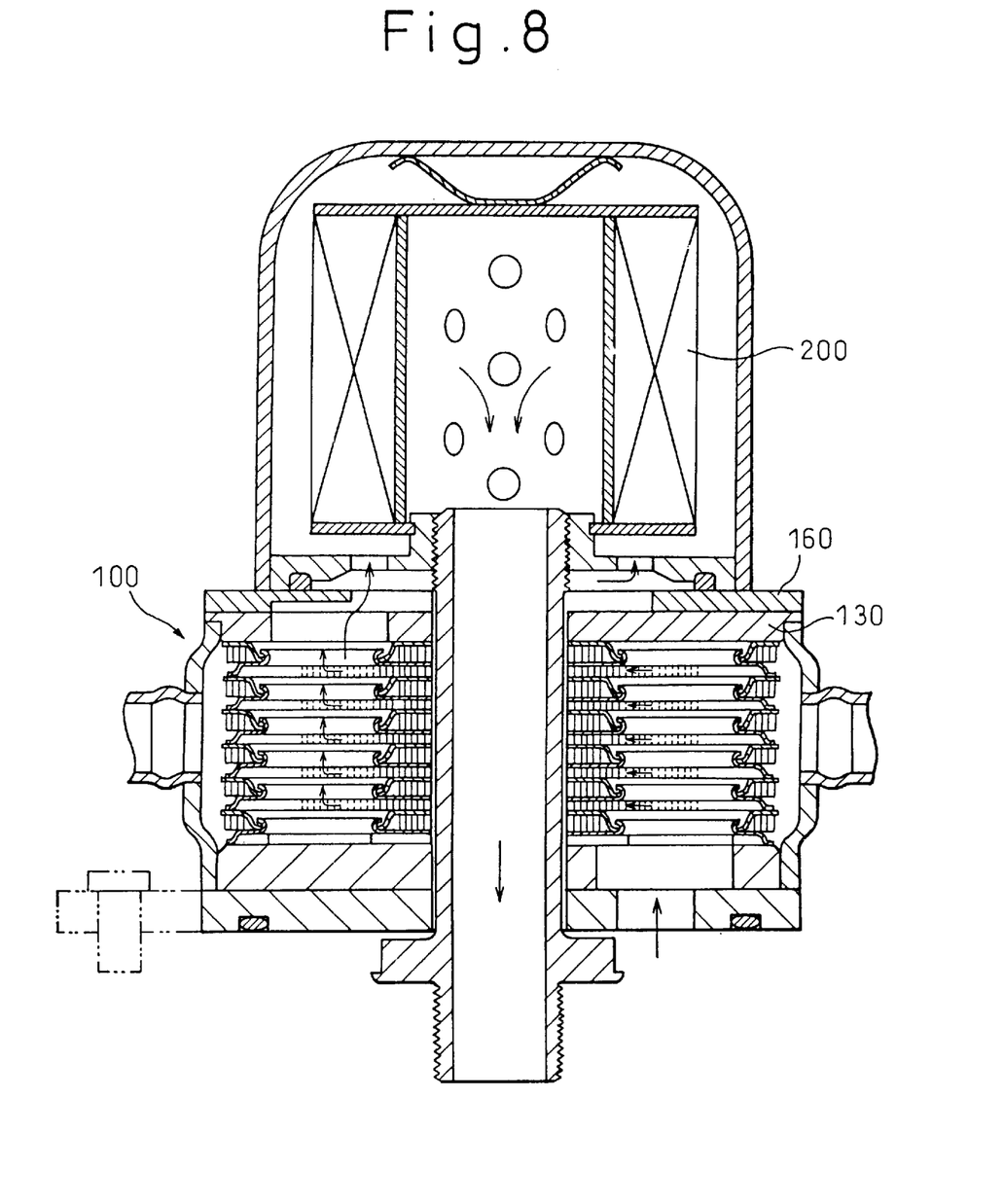
FIG. 8 is a sectional view of filter-integrated type oil cooler according to the fourth embodiment of the present invention.
Figure 9:
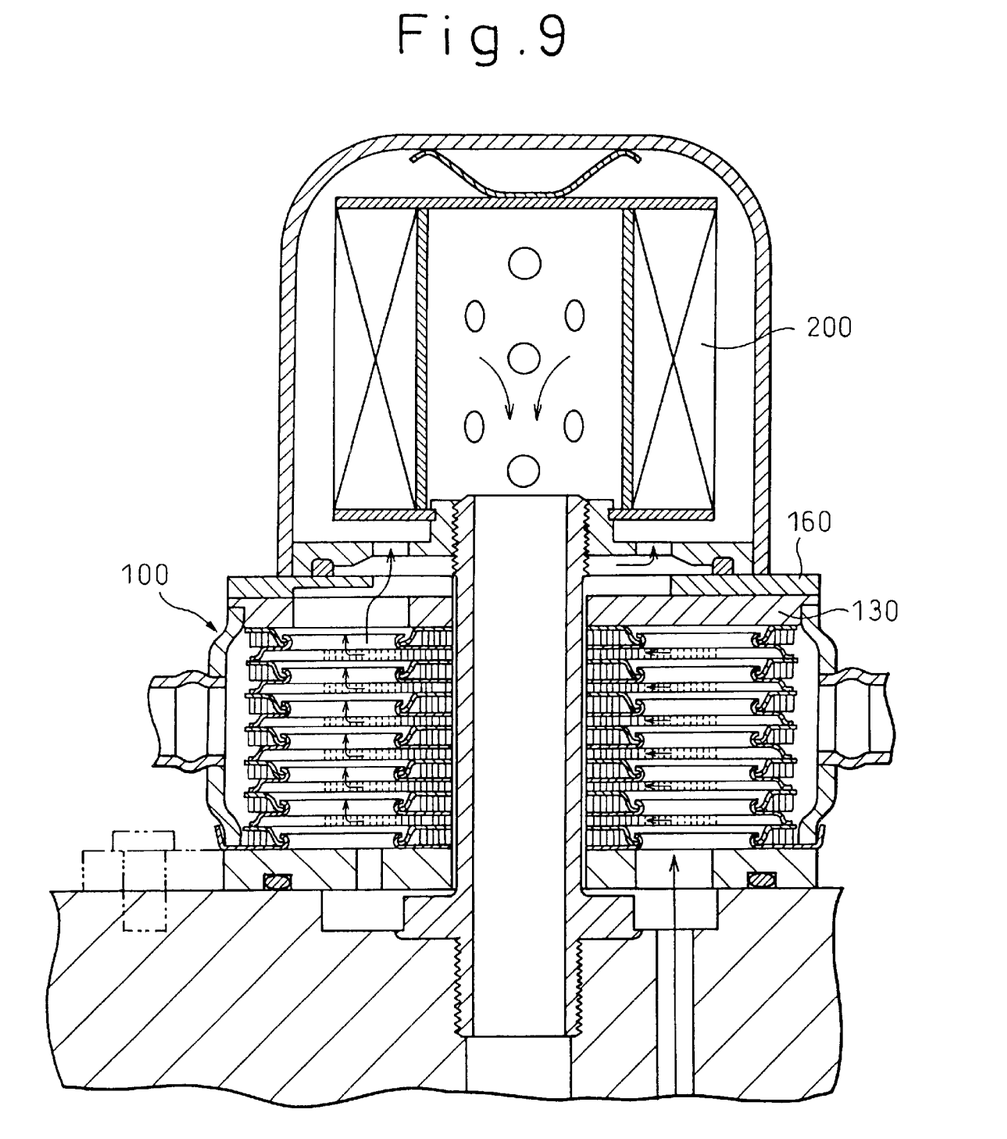
FIG. 9 is a sectional view of a modified example of the filter-integrated type oil cooler according to the fourth embodiment of the present invention.

This embodiment represents the application of the oil cooler 100 of the foregoing embodiments to a filter-integrated type oil cooler having a filter 200 for purifying the oil and the oil cooler 100 in a unitary structure as shown in FIGS. 8 and 9.

In the filter-integrated type oil cooler, the oil filter 200 is disposed on the first plate side. Therefore, the contact surface with the oil filter, too, must have the same predetermined surface texture as the seal surface 151 of the seal surface plate 150.

In this embodiment, a seal surface plate 160 on the filter side is disposed separately from the first plate 130, and the oil cooler unit OU before the assembly of the seal surface plate 150 and the seal surface plate 160 on the filter side is dipped into the flux. Both seal surface plates 150 and 160 are then brazed.

In this way, the seal surface plate 150, the seal surface plate 160 on the filter side and the oil cooler unit OU can be integrally brazed under the state where the flux is not applied to the seal surface plate 150 and the seal surface plate 160 on the filter side. When brazing is complete, therefore, the flux residue is extremely small on the seal surface plate 150 and the seal surface plate 160 on the filter side.

As described above, the oil cooler and its brazing method according to this embodiment can secure a predetermined surface texture on the seal surface plate 150 and the seal surface plate 160 on the filter side after completion of brazing while reducing the number of process steps necessary for applying the flux.

Incidentally, FIG. 8 shows an example of the application of the oil cooler 100 according to the first embodiment to the filter-integrated type oil cooler, and FIG. 9 shows an example of the application of the oil cooler 100 according to the third embodiment to the filter-integrated type oil cooler.

In the foregoing embodiments, the oil cooler has the core 110 that is produced by stacking a plurality of plates 111 and 112, but cores having other shapes may also be used.

INDUSTRIAL APPLICABILITY

The foregoing embodiments represent the application of the present invention to an oil cooler for cars, but the present invention can be applied likewise to motorcycles, and so forth.

Although the present invention has thus been described in detail with reference to some specific embodiments thereof, various changes and modifications could be made thereto by those skilled in the art without departing from the spirit and scope thereof.

What is claimed is:

1. A heat exchanger comprising:
   a heat exchange core (110) having a fluid passage (113) through which a fluid flows, for executing heat exchange of said fluid flowing inside said fluid passage;
   a casing (120) having openings (120a, 120b) for inserting said heat exchange core, for storing said heat exchange core;
   fall preventing members (130, 140, 180, 190) to prevent said heat exchange core from falling from said casing, brazed to said casing after being fixed to said casing; and
   seal surface plates (150, 160) finished to predetermined surface texture, and brazed to at least one of the sides of said fall preventing members and said casing after said heat exchange core and said fall preventing members are fixed to said casing.

2. A heat exchanger according to claim 1, wherein said fall preventing members (130, 140) are forced fit to said casing, and are then brazed to said casing.

3. A heat exchanger according to claim 1, wherein said fall preventing members (180, 190) are fixed by clinching to said casing, and are then brazed to said casing.

4. A heat exchanger according to claim 1, wherein said heat exchange core is produced by stacking a plurality of plates (111, 112) in a direction of thickness of said plates.

5. A heat exchanger according to claim 2, wherein said heat exchange core is produced by stacking a plurality of plates (111, 112) in a direction of thickness of said plates.

6. A heat exchanger according to claim 3, wherein said heat exchange core is produced by stacking a plurality of plates (111, 112) in a direction of thickness of said plates.

* * * * *